United States Patent
Yavid et al.

(10) Patent No.: US 7,199,933 B2
(45) Date of Patent: Apr. 3, 2007

(54) IMAGE PROJECTION SCREEN WITH REDUCED SPECKLE NOISE

(75) Inventors: Dmitriy Yavid, Stony Brook, NY (US); Miklos Stern, Woodmere, NY (US)

(73) Assignee: Symbol Technologies, Inc., Hortsville, NY (US)

( * ) Notice: Subject to any disclaimer, the term of this patent is extended or adjusted under 35 U.S.C. 154(b) by 100 days.

(21) Appl. No.: 11/131,138

(22) Filed: May 17, 2005

(65) Prior Publication Data

US 2006/0262409 A1    Nov. 23, 2006

(51) Int. Cl.
*G02B 27/10* (2006.01)
*G03B 21/60* (2006.01)
*G03B 21/56* (2006.01)

(52) U.S. Cl. .................. 359/626; 359/456; 359/460

(58) Field of Classification Search ............... 359/443, 359/449, 454, 456, 457, 460
See application file for complete search history.

(56) References Cited

U.S. PATENT DOCUMENTS

| | | | |
|---|---|---|---|
| 6,577,429 B1* | 6/2003 | Kurtz et al. ............... 359/279 |
| 6,594,090 B2* | 7/2003 | Kruschwitz et al. ........ 359/707 |
| 2006/0023165 A1* | 2/2006 | Ishihara et al. ............ 353/20 |
| 2006/0087628 A1* | 4/2006 | Dvorkis et al. ............ 353/121 |
| 2006/0187419 A1* | 8/2006 | Yavid ......................... 353/43 |

* cited by examiner

*Primary Examiner*—David N. Spector
(74) *Attorney, Agent, or Firm*—Kirschstein, et al.

(57) ABSTRACT

An image projection module within a housing is operative for causing selected pixels in a raster pattern to be illuminated to produce an image on a display screen of VGA quality. The screen is provided with an array of lenslets to reduce speckle noise in the image.

18 Claims, 7 Drawing Sheets

FIG. 1
FIG. 2
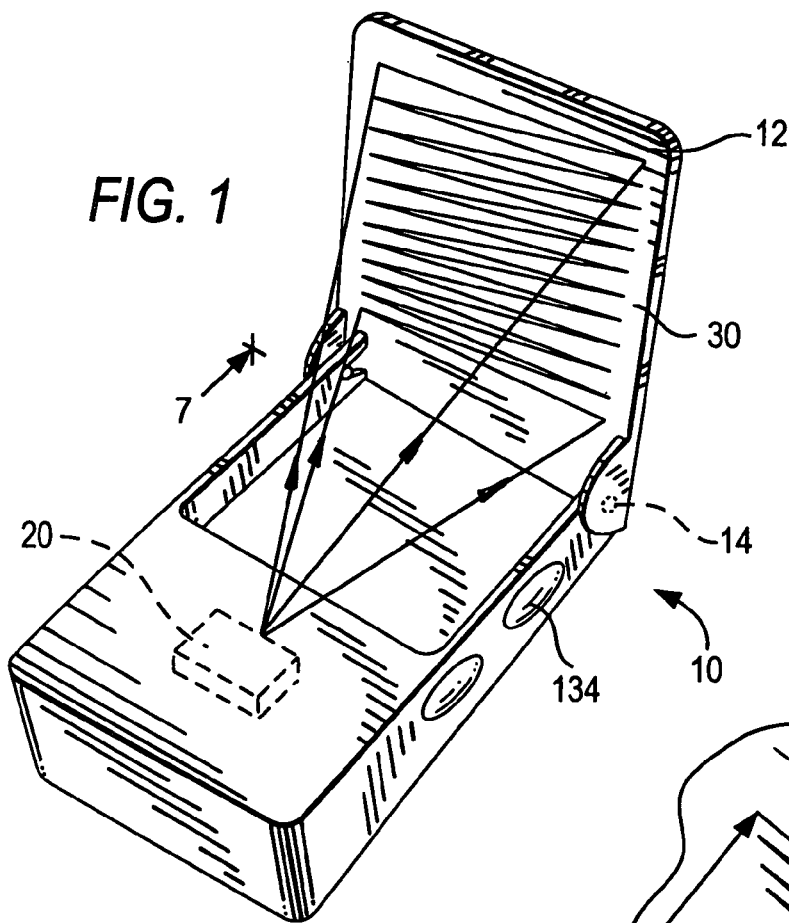
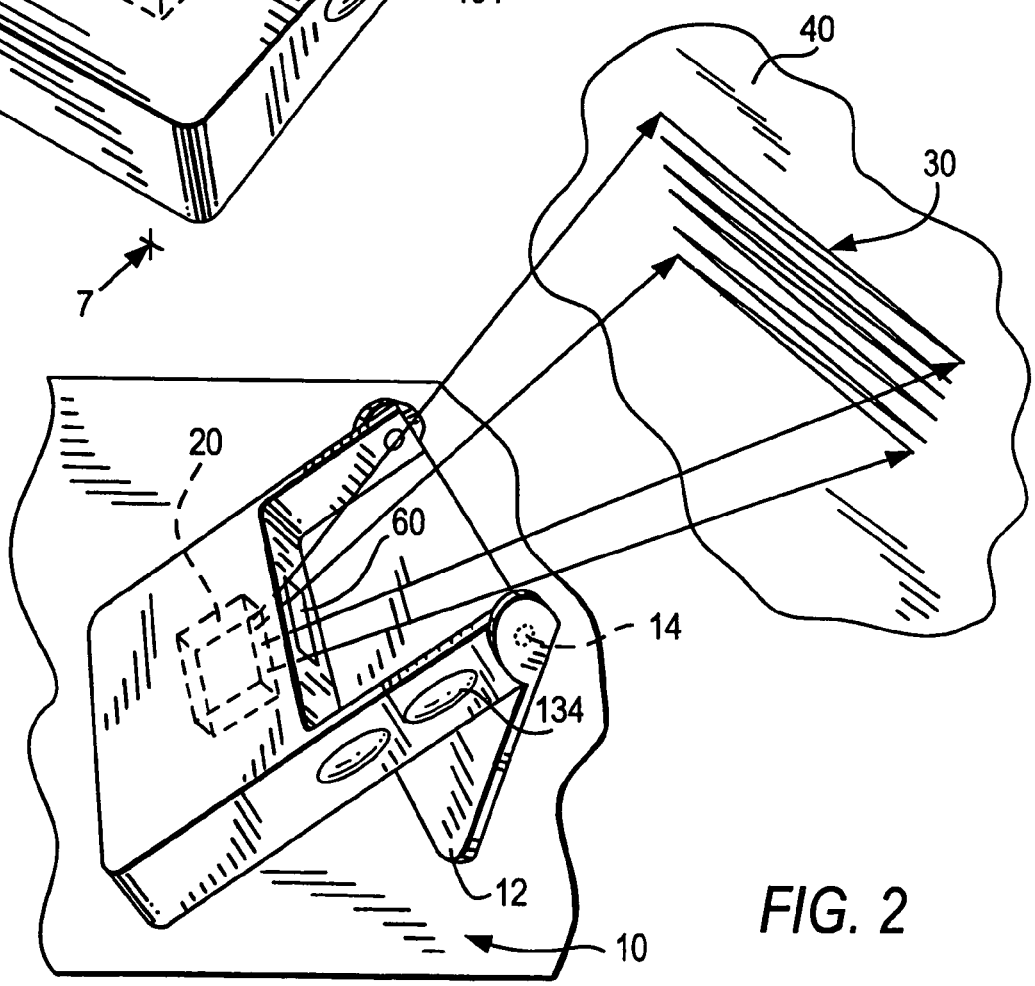

IMAGE PROJECTION SCREEN WITH REDUCED SPECKLE NOISE

BACKGROUND OF THE INVENTION

1. Field of the Invention

The present invention generally relates to projecting two-dimensional images with reduced speckle noise on display screens, especially a rear projection screen across which a laser beam is scanned.

2. Description of the Related Art

It is generally known to project a two-dimensional image on a display screen based on a pair of scan mirrors which oscillate in mutually orthogonal directions to scan a laser beam over a raster pattern. However, the known image projection systems project an image of limited resolution, typically less than a fourth of video-graphics-array (VGA) quality of 640×480 pixels, and with speckle noise. As such, the known projection systems and display screens have limited versatility.

Speckle noise is an inherent problem in laser-based projection systems and causes considerable degradation in image quality. A monochromatic (red, blue or green) laser emits a laser beam having coherent waves of the same frequency and also having spatial coherence, that is, the waves have a fixed phase relationship with one another both in space and in time. When the beam is incident on a rough, diffuse screen, the waves are scattered by being reflected from the screen and/or transmitted through the screen. The scattered waves have random phase delays and propagate along different directions, but all have the same frequency. When such scattered waves meet, for example, at the retina of the human eye, they produce a static distribution of constructive and destructive interference, i.e., an interference pattern, also known as speckle noise. The human eye whose integration time is on the order of tens of milliseconds sees the speckle noise as a degraded image. If the laser beam does not have entirely coherent waves, then their phase delays can change substantially during the time that the scattered waves take to negotiate the screen and, as a result, the speckle noise pattern changes as well during the integration time of the human eye, thereby reducing speckle contrast.

SUMMARY OF THE INVENTION

OBJECTS OF THE INVENTION

Accordingly, it is a general object of this invention to provide an image projection system that projects a speckle noise-reduced, sharp and clear, two-dimensional image on a display screen, especially a rear projection screen.

Another object of this invention is to reduce speckle noise on projected images.

Still another object of this invention is to modify a display screen itself to reduce speckle noise of images projected thereon.

FEATURES OF THE INVENTION

In keeping with these objects and others which will become apparent hereinafter, one feature of this invention resides, briefly stated, in an arrangement for, and a method of, projecting a two-dimensional image with reduced speckle noise, the arrangement including a display screen having front and rear surfaces, and an array of lenslets, an image projection assembly or module for directing a laser beam on the rear surface of the screen, and for sweeping the beam as a pattern of scan lines across the rear surface of the screen, each scan line extending along a scan direction and having a number of pixels, and for causing selected pixels to be illuminated, and rendered visible, to produce the image, the laser beam having a beam dimension along the scan direction; and means for reducing speckle noise by configuring each lenslet to have a lenslet dimension, as measured along the scan direction, which is at least equal to, and preferably larger than, said beam dimension.

In accordance with this invention, during the sweeping of the laser beam across the screen, most of the time only a single lenslet is illuminated by the laser beam at each moment. The phase coherence of the incident beam is preserved after passing through the array. At the junction between adjacent lenslets, the laser beam does simultaneously illuminate a portion of these adjacent lenslets and, to minimize such potential production of speckle noise, a polarization rotating coating is applied to alternate lenslets. This produces light of different polarizations which do not interfere with one another. The use of a polarization rotating coating allows the beam dimension to exceed the lenslet dimension.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of an arrangement for projecting an image on a display screen;

FIG. 2 is a perspective view of the arrangement of FIG. 1 for projecting an image at another display screen;

DETAILED DESCRIPTION OF THE PREFERRED EMBODIMENTS

Figure 3:
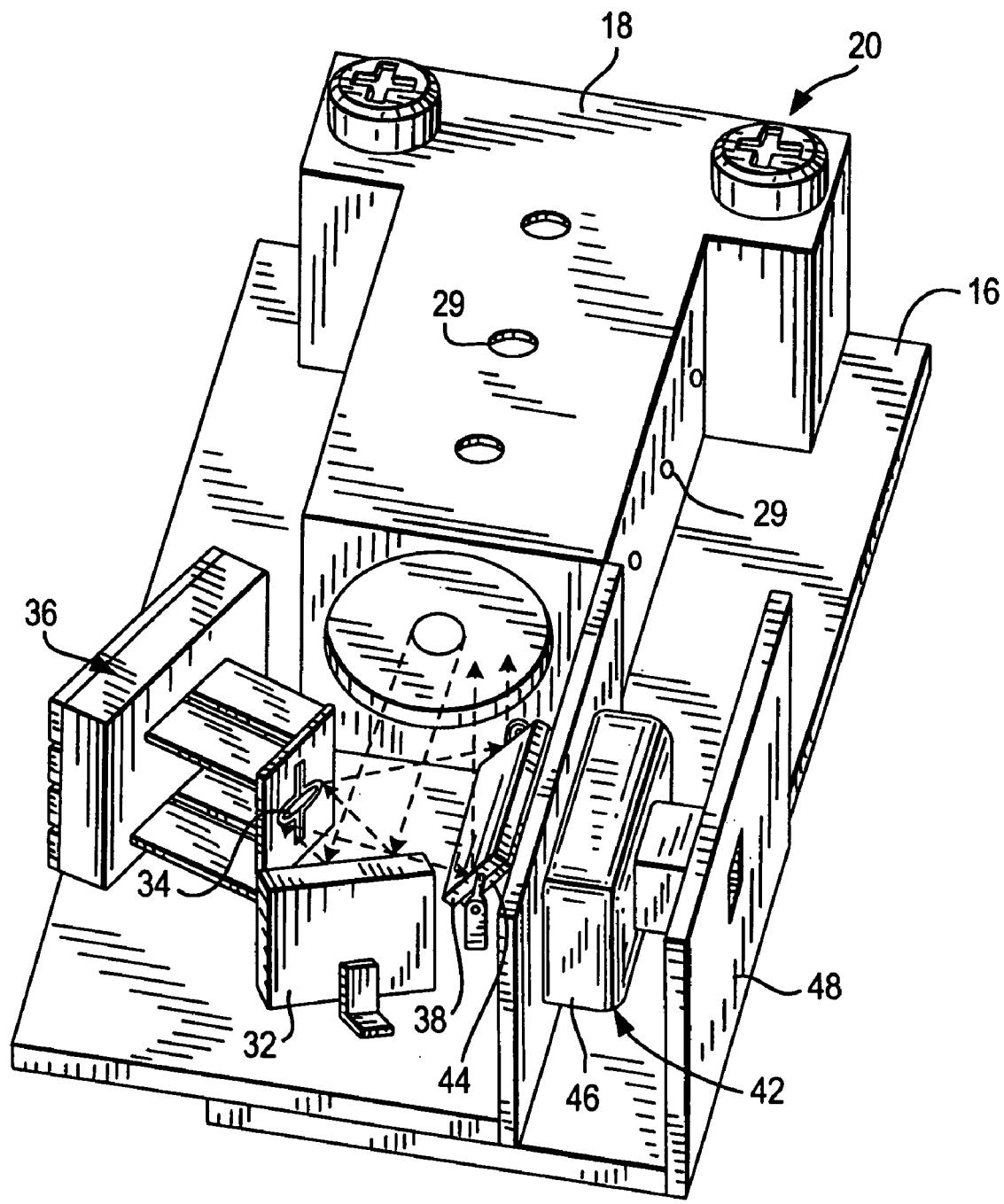
FIG. 3 is an enlarged, overhead, perspective view of an image projection assembly or module for installation in the arrangement of FIG. 1.

Reference numeral 10 in FIG. 1 generally identifies a housing in which a lightweight, compact, image projection module 20, as shown in FIG. 3, is mounted. The module 20 is operative for projecting a two-dimensional image at a distance from the module at different display screens. As described below, the image is comprised of illuminated and non-illuminated pixels on a raster pattern 30 of scan lines swept by a scanner in module 20.

The parallelepiped shape of the housing 10 represents just one form factor in which the module 20 may be incorporated. In the preferred embodiment, the module 20 measures about 30 mm×15 mm×10 mm or about 4.5 cubic centimeters. This compact, miniature size allows the module 20 to be mounted in housings of many diverse shapes, large or small, portable or stationary, some of which are described below.

Referring to FIG. 3, the module 20 includes a support 16, for example, a printed circuit board, and a laser/optics casing 18 in which are mounted a laser 25 (see FIG. 6) and a lens assembly, including one or more lenses and preferably a pair of lenses 22, 24 operative for optically modifying a laser beam emitted by the laser 25.

Figure 6:
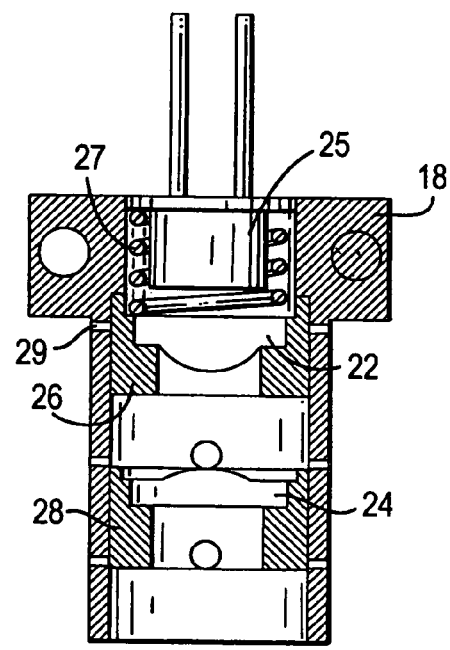
FIG. 6 is an enlarged sectional view of the laser/optics assembly of the module as taken on line 6—6 of FIG. 4.
Figure 5:
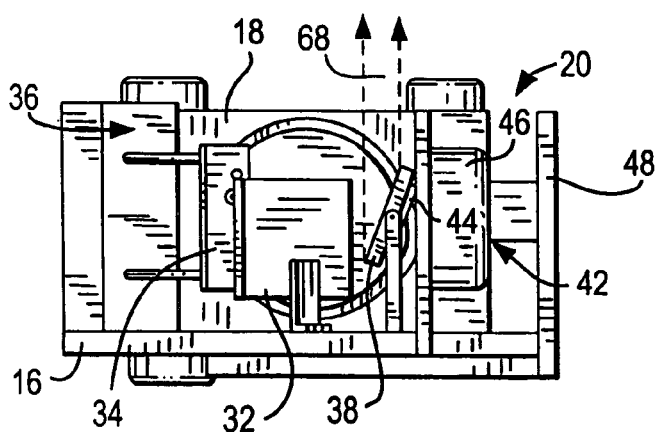
FIG. 5 is an end elevational view of the module of FIG. 2.

As best seen in FIG. 6, the laser 25 is a solid-state laser, preferably, a semiconductor laser, which, when energized, emits a laser beam having an oval cross-section. Lens 22 is a biaspheric convex lens having a positive focal length of about 2 mm and is operative for collecting virtually all the energy in the beam and for producing a diffraction-limited beam. Lens 24 is a concave lens having a negative focal length of about −20 mm. Lenses, 22, 24 are held by respective lens holders 26, 28 about 4 mm apart inside the casing 18 and are fixed in place by allowing an adhesive (not illustrated for clarity) introduced during assembly into the fill holes 29 to set. A coil spring 27 assists in positioning the laser. The lenses 22, 24 shape the beam profile.

The laser beam exiting the casing 18 is directed to, and reflected off, an optional stationary bounce mirror 32. A scanner is also mounted on the board 16 and includes a first scan mirror 34 oscillatable by an inertial drive 36 at a first scan rate to sweep the laser beam reflected off the bounce mirror over the first horizontal scan angle A (see FIG. 7), and a second scan mirror 38 oscillatable by an electromagnetic drive 42 at a second scan rate to sweep the laser beam reflected off the first scan mirror 34 over the second vertical scan angle B (see FIG. 7). In a variant construction, the scan mirrors 34, 38 can be replaced by a single two-axis mirror.

The inertial drive 36 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the module to less than one watt.

The electromagnetic drive 42 includes a permanent magnet 44 jointly mounted on and behind the second scan mirror 38, and an electromagnetic coil 46 operative for generating a periodic magnetic field in response to receiving a periodic drive signal. The coil 46 is adjacent the magnet 44 so that the periodic field magnetically interacts with the permanent field of the magnet 44 and causes the magnet and, in turn, the second scan mirror 38 to oscillate. The coil 46 is supported by an upright wall 48 connected to the board 16.

The inertial drive 36 oscillates the scan mirror 34 at a high speed at a scan rate preferably greater than 5 kHz and, more particularly, on the order of 18 kHz or more. This high scan rate is at an inaudible frequency, thereby minimizing noise and vibration. The electromagnetic drive 42 oscillates the scan mirror 38 at a slower scan rate on the order of 40 Hz which is fast enough to allow the image to persist on a human eye retina without excessive flicker.

The faster mirror 34 sweeps a horizontal scan line, and the slower mirror 38 sweeps the horizontal scan line vertically, thereby creating a raster pattern which is a grid or sequence of roughly parallel scan lines from which the image is constructed. Each scan line has a number of pixels. The image resolution is preferably VGA quality of 640×480 pixels. In some applications, a one-half VGA quality of 320×480 pixels, or one-fourth VGA quality of 320×240 pixels, is sufficient. At minimum, a resolution of 160×160 pixels is desired.

The roles of the mirrors 34, 38 could be reversed so that mirror 38 is the faster, and mirror 34 is the slower. Mirror 34 can also be designed to sweep the vertical scan line, in which event, mirror 38 would sweep the horizontal scan line. Also, the inertial drive can be used to drive the mirror 38. Indeed, either mirror can be driven by an electromechanical, electrical, mechanical, electrostatic, magnetic, or electromagnetic drive.

The image is constructed by selective illumination of the pixels in one or more of the scan lines. As described below in greater detail with reference to FIG. 8, a controller causes selected pixels in the raster pattern 30 to be illuminated, and rendered visible, by the laser beam. For example, a power controller 50 conducts an electrical current to the laser 25 to energize the latter to emit light at each selected pixel, and does not conduct an electrical current to the laser 25 to deenergize the latter to non-illuminate the other non-selected pixels. The resulting pattern of illuminated and non-illuminated pixels comprise the image, which can be any display of human- or machine-readable information or graphic. Instead of a power controller, an acousto-optical modulator could be used to deflect the laser beam away from any desired pixel to non-illuminate the pixel by not allowing the laser beam to reach the first scan mirror.

Figure 7:
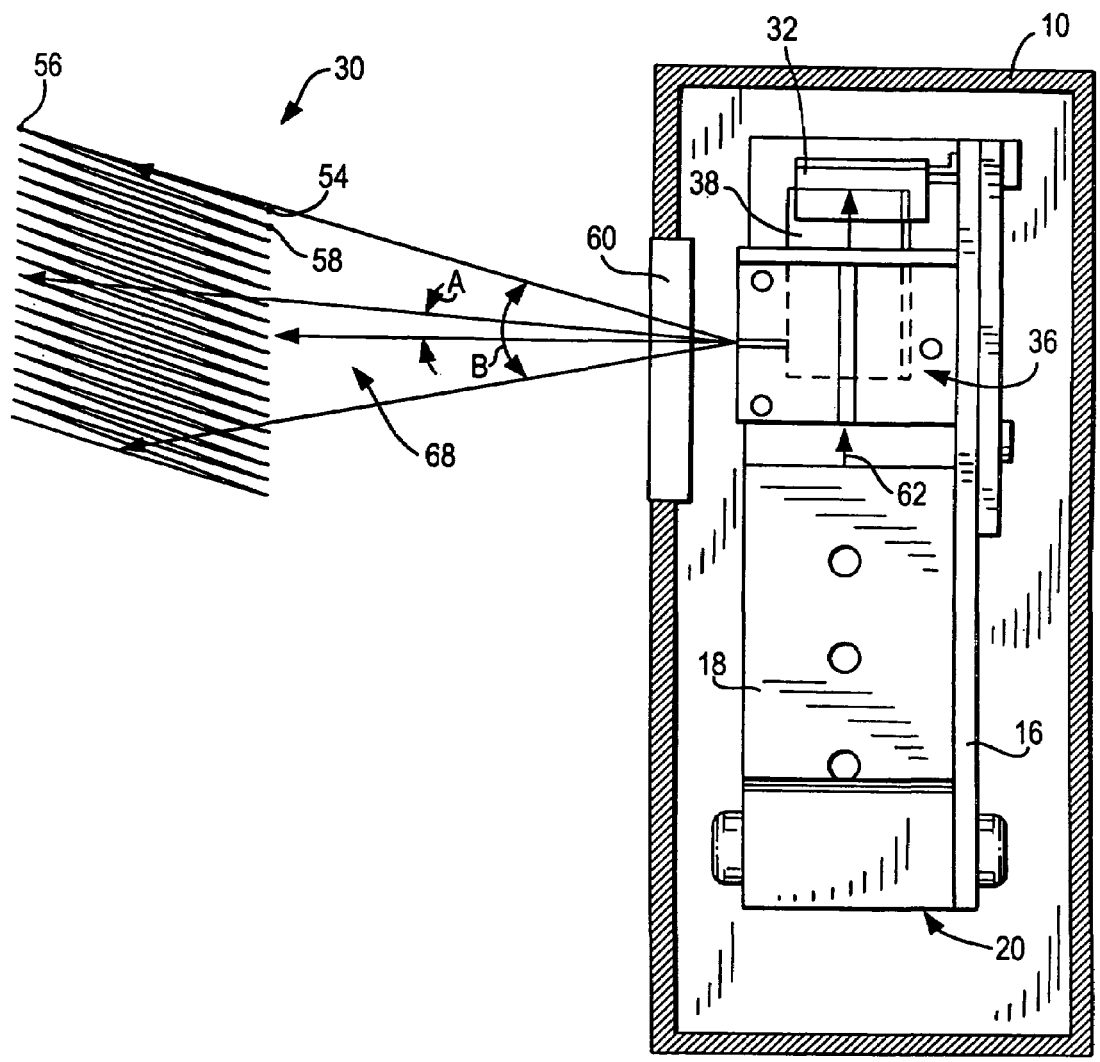
FIG. 7 is an enlarged sectional view taken on line 7—7 of FIG. 1.

Referring to FIG. 7, the raster pattern 30 is shown in an enlarged view. Starting at point 54, the laser beam is swept by the inertial drive along the horizontal direction at the horizontal scan rate to the point 56 to form a scan line. Thereupon, the laser beam is swept by the electromagnetic drive along the vertical direction at the vertical scan rate to the point 58 to form a second scan line. The formation of successive scan lines proceeds in the same manner.

The image is created in the raster pattern 30 by energizing or pulsing the laser on and off at selected times under control of a microprocessor or control circuit by operation of the power controller 50, or by maintaining the laser on and deflecting the laser beam at selected times by operation of an acousto-optical modulator. The laser produces visible light and is turned on, or its beam is properly deflected, only when a pixel in the desired image is desired to be seen. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 4:
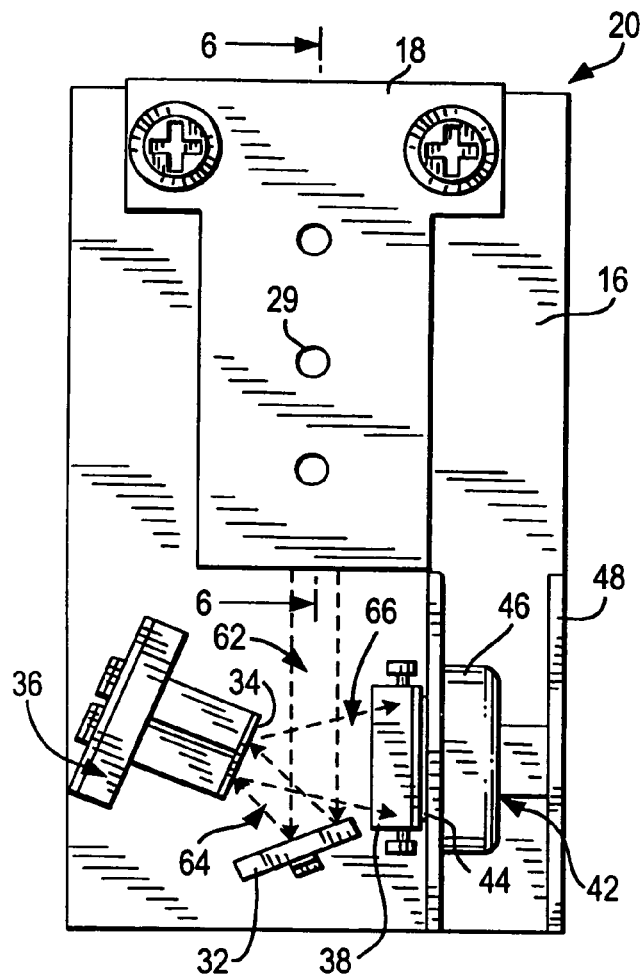
FIG. 4 is a top plan view of the module of FIG. 3.

FIG. 7 also shows a light-transmissive port or window 60 on the housing 10 and through which the image is projected in a direction generally perpendicular to the printed circuit board 16. Again, with reference to FIG. 4, the optical path of the laser beam has a vertical leg 62 between the laser/optics casing 18 and the bounce mirror 32, an inclined leg 64 toward the left to the scan mirror 34, a horizontal leg 66 toward the right to the scan mirror 38, and a forward leg 68 (see FIG. 7) in a direction toward the window 60 and perpendicular to the board 16. The image can be projected on any translucent or reflective surface, such as screen 12, which is adapted, as explained below, in accordance with this invention.

Figure 8:
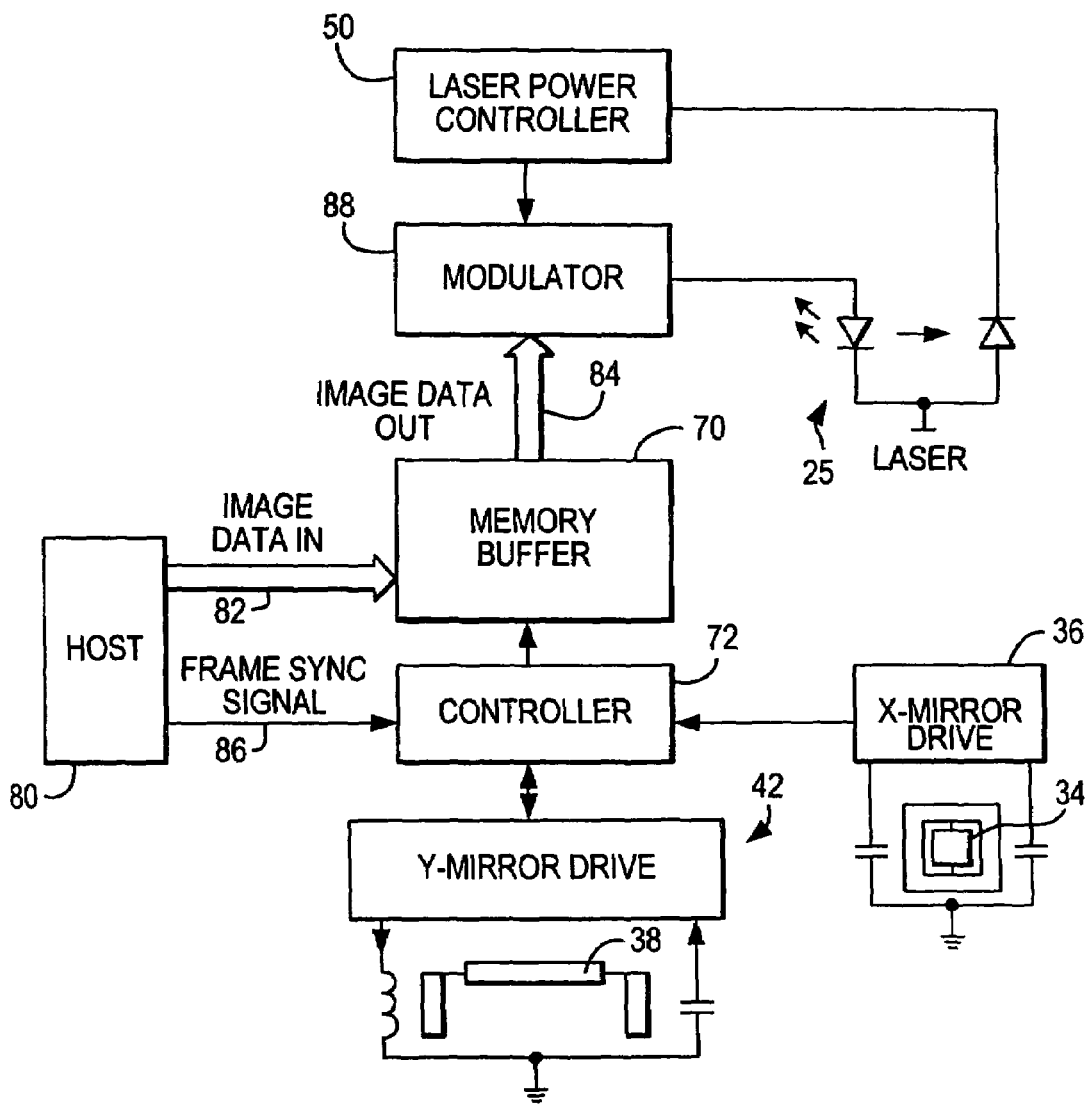
FIG. 8 is an electrical schematic block diagram depicting operation of the module of FIG. 3.

As shown in FIG. 8, a host 80 sends the bit-mapped image data 82 to a memory buffer 70 which is controlled by a memory controller 72. The storage of one full VGA frame would require about 300 kilobytes, and it would be desirable to have enough memory in the buffer 70 for two full frames (600 kilobytes) to enable one frame to be written by the host, while another frame is being read and projected. On the other hand, if the size of the buffer is smaller than a full frame, then the controller 72 can begin displaying lines after the memory has reached its maximum storage capacity with data sent by the host, or there can be simultaneous reading from and writing to the buffer. A frame synchronization signal 86 is sent by the host to the controller 72.

The first scan mirror 34, also known as the high speed or X-axis mirror, is driven by the inertial drive 36 and is controlled by the memory controller 72. Similarly, the second scan mirror 38, also known as the slow speed or Y-axis mirror, is driven by the electromagnetic drive 42 and is controlled by the memory controller 72. Since the image is projected during both forward and backward scans of the X-axis mirror, every other line of image data is displayed in reverse order. Hence, either the host has to write the image data to the buffer in the reverse order, or the memory controller has to read the image data in the reverse order.

The X-axis mirror has a sinusoidal velocity profile. In a given time interval, the laser beam sweeps more pixels in the middle of each scan line than at the ends of each scan line. To avoid image distortion, either the memory controller 72 should clock the pixels at a variable clock rate, or the host should fill the buffer 70 with data in which the size of the pixels is varied. A variable clock rate is the preferred technique since it allows pixels of a fixed size to be shared with other displays.

The output of the buffer is a digital signal 84 which is frame-synchronized with the host, and clock- and line-synchronized with the X-axis mirror 34. This digital signal is sent to a modulator 88 which, in turn, controls the laser 25.

Figure 9:
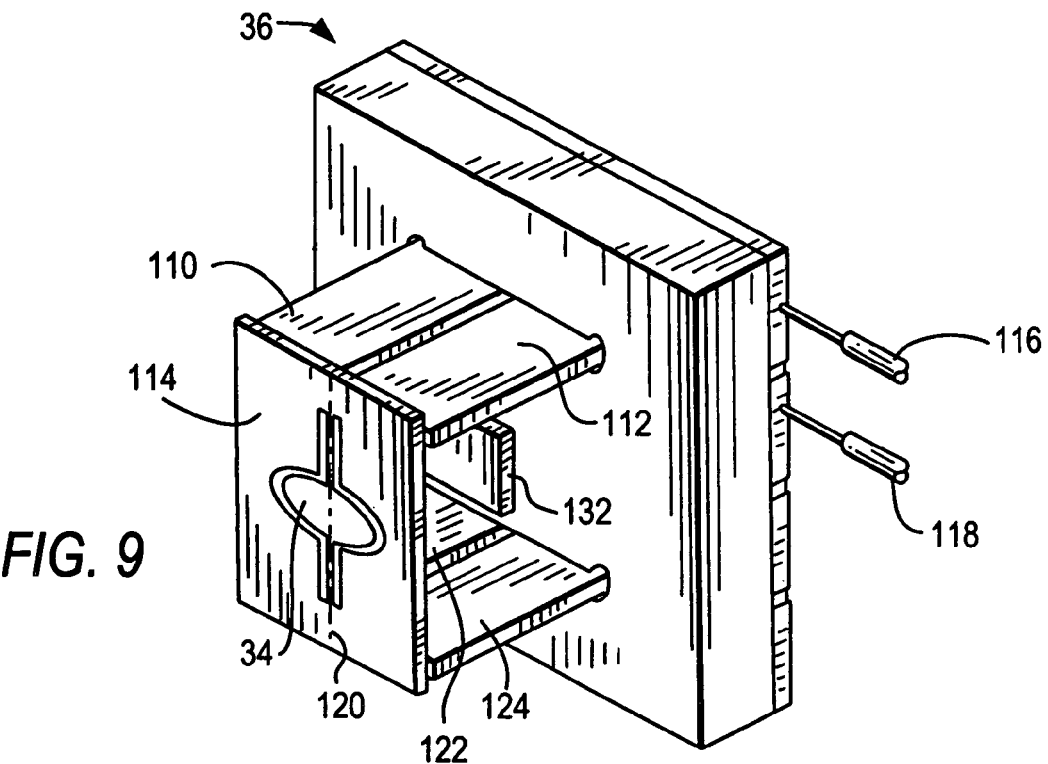
FIG. 9 is a front perspective view of a drive for the module of FIG. 2.
Figure 10:
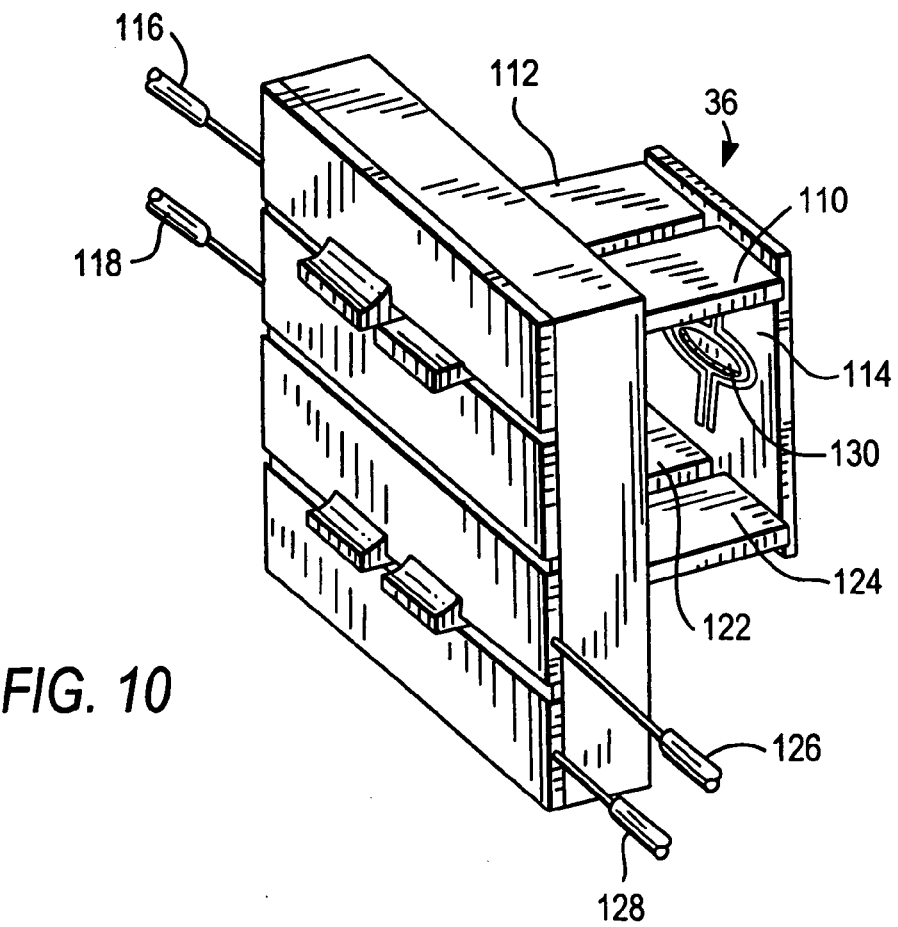
FIG. 10 is a rear perspective view of the drive of FIG. 9.

FIGS. 9–10 depict the inertial drive 36 in isolation. As described in the aforementioned U.S. patent application Ser. No. 10/387,878, filed Mar. 13, 2003, an upper pair of piezoelectric transducers 110, 112 contacts spaced-apart portions of a frame 114 above the scan mirror 34 and is electrically connected by wires 116, 118 to a periodic alternating voltage source. In use, the periodic source causes the transducers 110, 112 to alternatingly extend and contract in length, thereby causing the frame 114 to twist about a hinge axis 120. The scan mirror 34 is connected to the frame at opposite ends of the hinge axis and oscillates about the hinge axis at a resonant frequency.

A lower pair of piezoelectric transducers 122, 124 contacts spaced-apart locations of the frame 114 below the scan mirror 34. The transducers 122, 124 serve as feedback or pick-up mechanisms to monitor the oscillating movement of the frame and to generate and conduct electrical feedback signals along wires 126, 128 to a feedback control circuit.

However, vibrations induced by the transducers 110, 112 are detected by the transducers 122, 124 and tend to corrupt the feedback signals, thereby adversely affecting the projected image. Hence, the drive and pick-up mechanisms are preferably made different, for example, by not basing both mechanisms on the piezoelectric effect. One of the mechanisms is based on a different type of mechanism. For example, as shown in FIG. 10, a magnet 130 is jointly mounted behind the mirror 34 for joint oscillation therewith, and an electromagnetic feedback coil 132, as shown in FIG. 9, is mounted adjacent the magnet 130. The coil 132 senses the periodic electromagnetic field induced by the moving magnet and is immune from vibrations from the transducers 110, 112.

Returning to FIGS. 1–2, the screen 12 is pivotably mounted on the housing 10 at pivots 14 to any one of a plurality of positions. For example, as shown in FIG. 1, the screen 12 lies in a vertical plane, and the bit-mapped image of the raster pattern 30 is projected through the window 60 by the module 20 onto the vertical screen, which defines an image plane. The screen 12 can be tilted back to form an obtuse angle with the horizontal for more convenient viewing from the front of the housing, thereby defining another image plane. Other angles, including acute angles, could also be employed. As shown in FIG. 2, the screen 12 can be pivoted to an angular position in which the screen supports the housing 10 in a tilted position, in which case, the image is not projected on the screen 12, but instead, is projected on a remote display surface, such as a remote display screen 40, which defines still another image plane. An actuator 134 is manually depressed to initiate the image projection. Thus, in the embodiment of FIGS. 1–2, the image can be projected on-board the housing 10 on the screen 12 in any one of a multitude of angular positions, or off-board the housing on the remote screen 40, or some other analogous display surface.

As explained above, the images on screens 12, 40 suffer degradation due to speckle noise primarily because the laser 25 has coherent waves which scatter as the laser beam is reflected from and/or passes through the screens 12, 40, and these scattered waves combine to form a stationary interference pattern.

Figure 11:
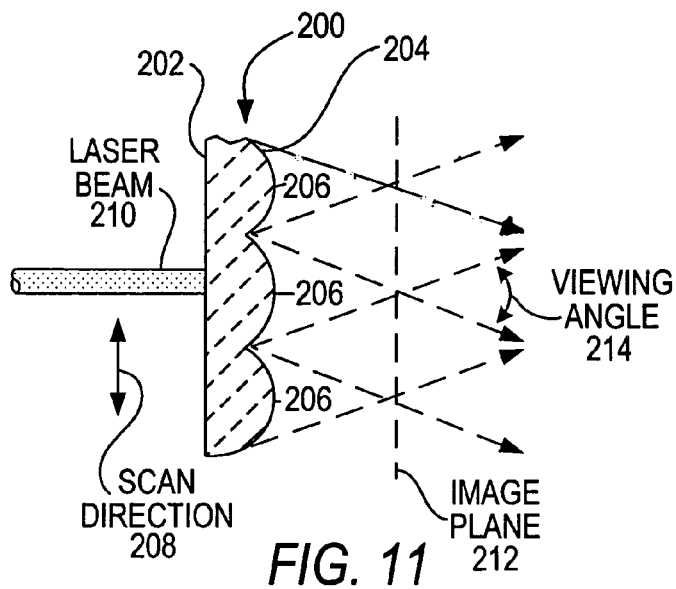
FIG. 11 is a diagrammatic view of a rear projection display screen for reducing speckle noise in accordance with one embodiment of this invention.

In accordance with this invention, rather than the front projection screens 12, 40 discussed above, a rear projection screen 200, as depicted in FIG. 11, is employed and modified to reduce speckle noise. The screen 200 has a rear surface 202, a front surface 204, and an array of lenslets 206 incorporated therein. Each lenslet has a positive or a negative optical power and is preferably a spherical lens, but could also be a cylindrical lens, or a torical lens in which the curvatures of the front surfaces are different in mutually orthogonal directions. The lenslets are preferably arranged in mutually orthogonal linear rows and columns.

The laser beam projected from the image projection module 20 is schematically shown in FIG. 11 by the reference numeral 210, and is oscillated in either scan direction as illustrated by the double-headed arrow 208 by the scanner within the module 20. The laser beam is incident on, and swept across, the rear surface 202 of the screen 200. Each lenslet focuses the incident laser beam to a focal point at an image plane 212, after which the light diverges at a viewing angle 214. The viewing angle is roughly equal to the lenslet diameter (in the case of a spherical lenslet) divided by its focal distance. In a preferred embodiment, the lenslet diameter is about 0.2 mm, the focal distance to the image plane is about 0.3 mm, and the viewing angle is ±20°. The viewing angle can be changed by varying the lenslet diameter and/or the focal distance.

The incident laser beam 210 has coherent, or substantially coherent, waves. After passing through a lenslet 206, the laser beam 210 mostly preserves its phase coherence and does not interfere with itself, thereby avoiding speckle noise.

Figure 12:
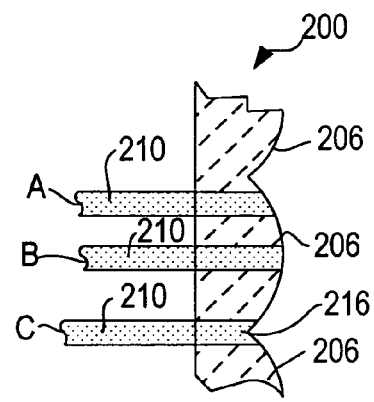
FIG. 12 is an enlarged view of the screen of FIG. 11 during sweeping of a laser beam.

One feature of this invention seeks to ensure that, at least most of the time, only one lenslet at a time is illuminated by the laser beam. This is depicted in FIG. 12, in which the laser beam 210 at position A is only illuminating a single lenslet 206. This is also demonstrated at position B where the laser beam 210 is also only illuminating a single lenslet. Some interference is possible when the laser beam is at position C, at which the laser beam is incident on a cusp 216 between two adjacent lenslets and, hence, the laser beam is illuminating simultaneously these two adjacent lenslets.

In accordance with this invention, the lenslet dimension, as measured along the scan direction, is made at least equal to, but preferably larger than, a beam dimension of the laser beam, again as measured along the scan direction. As shown in FIG. 12, the beam dimension, e.g., the width of the beam in cross-section, is less than the width of the lenslet dimension. This feature ensures that there are not many cusps and that most of the time, only one lenslet at a time is illuminated by the incident laser beam. On the other hand, the lenslet dimension cannot be made too large and, indeed, must be kept smaller than the width dimension of each virtual pixel, as considered along each scan line, of the image, in order not to compromise the image resolution.

Figure 13:
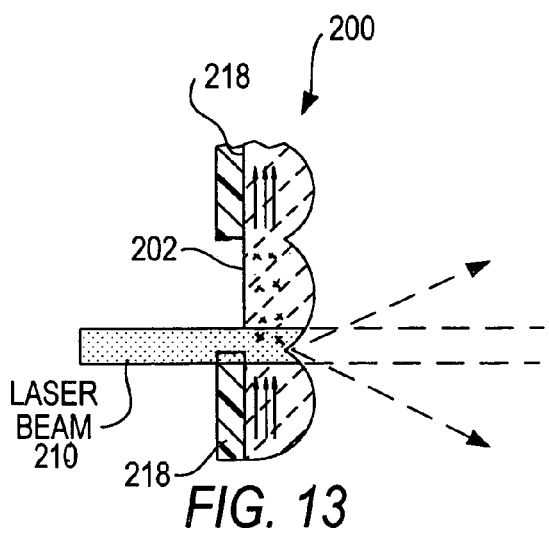
FIG. 13 is a diagrammatic view of the screen of FIG. 11, and modified in accordance with another embodiment of this invention.
Figure 14:
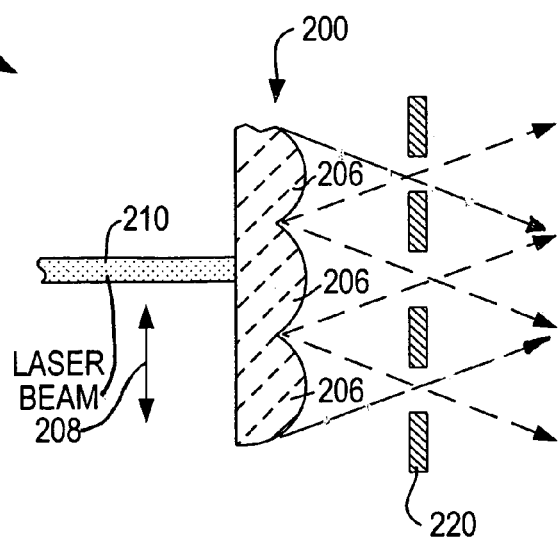
FIG. 14 is a view analogous to FIG. 11, and modified in accordance with still another embodiment of this invention.

Further improvement in reducing speckle noise is depicted in FIG. 13, where a polarization rotating coating 218 is applied to alternate lenslets. In this case, the two adjacent lenslets emit light of different polarizations and will not interfere with each other to produce speckle noise when the incident beam illuminates a cusp 216. In FIG. 13, the vertical arrows represent one polarization, while the x's represent the perpendicular polarization. The coating 218 is located on the rear surface 202. Cellophane is an anisotropic material which behaves as a half-waveplate and is the preferred material for the coating 218. When the coating 218 is used, the beam dimension can be larger than the lenslet dimension.

In addition to speckle reduction, an apertured black (light absorbing) mask 220 is positioned at the image plane 212, the apertures in the mask allowing the focused light to pass therethrough. The apertured mask increases the contrast of the illuminated pixels, especially in the presence of strong ambient light, such as sunlight.

By substituting the lenslets with micromirrors, the ideas expressed herein are applicable for front projection screens.

The laser beam 210 may have a single wavelength for use in projecting monochromatic images, or may be a composite laser beam of multiple wavelengths (red, blue and green) from multiple laser sources for use in projecting color images.

It will be understood that each of the elements described above, or two or more together, also may find a useful application in other types of constructions differing from the types described above.

While the invention has been illustrated and described as embodied in an image projection arrangement for, and method of, projecting images on a screen modified to reduce speckle noise, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for projecting an image with reduced speckle noise, comprising:
    a) a display screen having front and rear surfaces, and an array of lenslets;
    b) an image projection assembly for directing a laser beam on the rear surface of the screen, and for sweeping the beam as a pattern of scan lines across the rear surface of the screen, each scan line extending along a scan direction and having a number of pixels, and for causing selected pixels to be illuminated, and rendered visible, to produce the image, the laser beam having a beam dimension along the scan direction; and
    c) means for reducing speckle noise by configuring each lenslet to have a lenslet dimension, as measured along the scan direction, which is not less than said beam dimension.

2. The arrangement of claim 1, wherein the assembly includes a laser for emitting the laser beam.

3. The arrangement of claim 2, wherein the laser is one of a red, blue and green laser.

4. The arrangement of claim 1, wherein the lenslet dimension is larger than said beam dimension.

5. The arrangement of claim 1, wherein the lenslets are successively arranged along the scan direction; and a polarization rotating coating on alternate lenslets.

6. The arrangement of claim 4, wherein each lenslet has a spherical curvature.

7. The arrangement of claim 1; and an apertured mask at an image plane of the array of lenslets.

8. The arrangement of claim 7, wherein the mask absorbs the laser beam incident thereon.

9. A method of projecting an image with reduced speckle noise, comprising the steps of:
    a) emitting a laser beam;
    b) directing the beam to be incident on a rear surface of a display screen, and sweeping the beam as a pattern of scan lines across the rear surface of the screen, each scan line extending along a scan direction and having a number of pixels, and causing selected pixels to be illuminated, and rendered visible, to produce the image, the laser beam having a beam dimension along the scan direction; and
    c) forming the screen with an array of lenslets, and configuring each lenslet to have a lenslet dimension, as considered along the scan direction, which is not less than said beam dimension, thereby reducing speckle noise.

10. The method of claim 9, wherein the emitting step is performed by one of a red, blue and green laser.

11. The method of claim 9, wherein the lenslet dimension is larger than the beam dimension.

12. The method of claim 9, and arranging the lenslets in succession along the scan direction; and applying a polarization rotating coating on alternate lenslets.

13. The method of claim 9, wherein each lenslet has a spherical curvature.

14. The method of claim 9, and positioning an apertured mask at an image plane of the array of lenslets.

15. A display screen for reducing speckle noise in an image projected by a laser beam on the screen, comprising: an array of lenslets arranged in succession along a scan direction, each lenslet having a lenslet dimension, as measured along the scan direction, which is not less than a beam dimension, again as measured along the scan direction, of the laser beam.

16. The display screen of claim 15, and a polarization rotating coating on alternate lenslets.

17. The display screen of claim 15, wherein each lenslet has a spherical curvature.

18. An arrangement for projecting an image with reduced speckle noise, comprising:
 a) a display screen having front and rear surfaces, and an array of lenslets successively arranged along a scan direction;
 b) an image projection assembly for directing a laser beam on the rear surface of the screen, and for sweeping the beam as a pattern of scan lines across the rear surface of the screen, each scan line extending along the scan direction and having a number of pixels, and for causing selected pixels to be illuminated, and rendered visible, to produce the image; and
 c) a polarization rotating coating on alternate lenslets for reducing speckle noise.

* * * * *